United States Patent

Hirukawa et al.

[11] Patent Number: 5,320,903
[45] Date of Patent: Jun. 14, 1994

[54] MODIFIED CELLULOSE REGENERATED FIBER COMPRISING CHITOSAN PARTICLES

[75] Inventors: Tsuguhisa Hirukawa; Hiroaki Tanibe, both of Shizuoka; Tuguo Miyaji, Touyo, all of Japan

[73] Assignee: Fuji Spinning Co., Ltd., Tokyo, Japan

[21] Appl. No.: 834,160

[22] Filed: Feb. 12, 1992

[51] Int. Cl.$^5$ .............................................. B32B 5/16
[52] U.S. Cl. .................................. 428/364; 428/326; 428/393; 428/536; 536/20
[58] Field of Search ............... 428/303, 536, 326, 364, 428/393; 106/163.1, 164, 165, 168, 204; 536/20

[56] References Cited

U.S. PATENT DOCUMENTS 3,103,732  9/1963  Woodell .......................... 428/536 X
4,392,916  7/1983  Nishiyama et al. ............. 162/157.1

FOREIGN PATENT DOCUMENTS 62-62827  3/1987  Japan .
62-100534  5/1987  Japan .
241473   2/1990  Japan .
2160972  6/1990  Japan .

OTHER PUBLICATIONS

"Kobunshikako"-Kobunshi Kankokai, vol. 14, pp. 198-205 (1965).
"Kobunshi Kagaku"-Kobunshi Gakkai, vol. 30, pp. 320-326 (1973).

*Primary Examiner*—Paul J. Thibodeau
*Assistant Examiner*—H. Thi Lê
*Attorney, Agent, or Firm*—Birch, Stewart, Kolasch & Birch

[57] ABSTRACT

The present invention is to provide a modified cellulose regenerated fiber having a practically endurable tenacity, and being excellent in dye-affinity, and having antifunguses and deodorizing properties. The present invention comprises preliminarily molding chitosan or acetylated chitosan into a fine particle, mixing the fine particle body with cellulose viscose prior to spinning, and spinning the mixture, at the inclusion regenerated fiber.

6 Claims, 1 Drawing Sheet

MODIFIED CELLULOSE REGENERATED FIBER COMPRISING CHITOSAN PARTICLES

BACKGROUND OF THE INVENTION

1. Field of the Invention

The present invention relates to a modified cellulose regenerated fiber having the tenacity practically endurable, being excellent in dye-affinity and having also anti-funguses and deodorizing properties, and is to provide a fiber to be utilized in the field of yarns, textile fabrics, knitted woven fabrics, non-woven fabrics, paper making, and the like.

2. Description of the Prior Art

The technique of mixing chitin viscose or chitosan viscose with cellulose viscose for spinning has been investigated traditionally for the purpose of improving dye-affinity, and is described, for example, in "Kobunshikako", Kobunshi Kankokai, Vol. 14, pp. 198–205 (1965), such that chitosan is viscosylated through a sulfide process, and is then mixed with cellulose viscose at an appropriate ratio for spinning to produce chitosan/cellulose fiber, which can be stained with acidic dyes and dyes of metal complex salts. It is also described in "Kobunshi Kagaku", Kobunshi Gakkai, Vol. 30, pp. 320–326 (1973), that chitin/ cellulose fiber can be obtained by mixing and spinning of chitin viscose with cellulose viscose, and that the increase in the chitin content results in the improvement of dye-affinity.

Due to the recent demand for amenity in life space and the social factor of the increase in the number of aged people, there has developed a need for those fiber products having anti-funguses and odor-preventing properties and deodorizing and odor-destroying properties.

Japanese Patent Laid-open No. 41473/1990 proposes an anti-funguses fiber and the method for producing the same, the fiber being obtained by immersing a fiber having at least one functional group consisting of hydroxyl group, amino group and carboxyl group in an aqueous solution of chitin, chitosan and their derivatives, before drying, and cross-linking the resultant fiber in the presence of an organic solvent such as benzene and the like using a polyisocyanate compound. Japanese Patent Laid-open No. 160972/1990 discloses a technique wherein porous ceramic is dissolved in solid into the cotton fiber to provide the fiber itself with water absorbability and water releasability, and an anti-funguses agent of chitosan acetate or of cross-linked chitosan molecule is allowed to immerse into ceramic microspores, to prevent microbial deposition and growth, so as to prevent dermal disorders inducing inflammation on skin surface which generates steamy feeling and an unpleasant odor, and to prevent co-occurrence of other diseases.

Chitin or chitosan/cellulose mixed fiber obtained by preliminarily viscosylate chitin or chitosan which is then mixed with cellulose viscose for spinning, in accordance with the prior art techniques, results in the mixing of essentially two different components, namely, chitin or chitosan viscose and cellulose viscose, and the solidification and regeneration thereof in a solidifying solution of the same composition, so it causes a distinct reduction in the tenacity (dry tenacity, wet tenacity and knot tenacity). Hence, no practically endurable fiber has been obtained up to now in practical meaning.

The method proposed in Japanese Patent Laid-open No. 41473/1990 is not only complex in its procedure but also triggers a decrease in the whiteness of fiber and cloth and dramatically damages the hygroscopic property or water releasability inherent to a fiber per se, because the surface of a fiber is basically coated with chitin, chitosan and the derivatives thereof and both of the two are cross-linked with a polyisocyanate compound in order to facilitate their strong bonding with the fiber.

The technique proposed by Japanese Patent Laid-open No. 160972/1990 comprises enlarging the microholes which a fiber inherently has, by preliminarily swelling the fiber with organic solvents or aqueous solvents, subsequently immersing the fiber along with ceramic microparticles in a heated and pressurized processing solution, thereby injecting the ceramics into the microholes, and then impregnating an anti-funguses such as quarternary ammonium salt and chitosan acetate into the ceramic microholes, which is then washed in water and is left to stand in constant atmosphere to block the swelling microholes of the cotton fiber. Hence, the technique has disadvantages such as its complex procedure, the reduction in the tenacity of fiber itself and the difficulty of controlling the exact contents of effective components, due to the charge into the microholes swelled with organic solvents and the like.

SUMMARY OF THE INVENTION

The present inventors have investigated intensively in order to solve such problems, and have reached the present invention. It is an object of the present invention to provide a modified cellulose regenerated fiber having an improved dye-affinity and anti-funguses and deodorizing properties, without damaging the integral properties of the fiber per se, such as hygroscopic property and the like.

It is another object of the present invention to provide a modified cellulose regenerated fiber having a sufficient tenacity, practically endurable and being excellent in safety without damaging the integral properties of the fiber.

According to the present invention, fine particle regenerated chitosan or fine particle regenerated acetylated chitosan is mixed with cellulose viscose prior to spinning, and then the viscose is spun permitting the cellulose regenerated fiber to contain such fine particle regenerated chitosan or fine particle regenerated acetylated chitosan.

The cellulose regenerated fiber of the present invention is obtained by the preliminary molding of chitosan or the derivatives thereof in a fine particle body of 10 μm or less, mixing the fine particles with cellulose viscose prior to spinning, and spinning the resultant mixture, so that fine particle regenerated chitosan or fine particle regenerated acetylated chitosan is allowed to be contained in a cellulose regenerated fiber.

These and other object of the present invention will become more apparent in the detailed description and examples which follow.

DETAILED DESCRIPTION OF DRAWING

Figure 1:
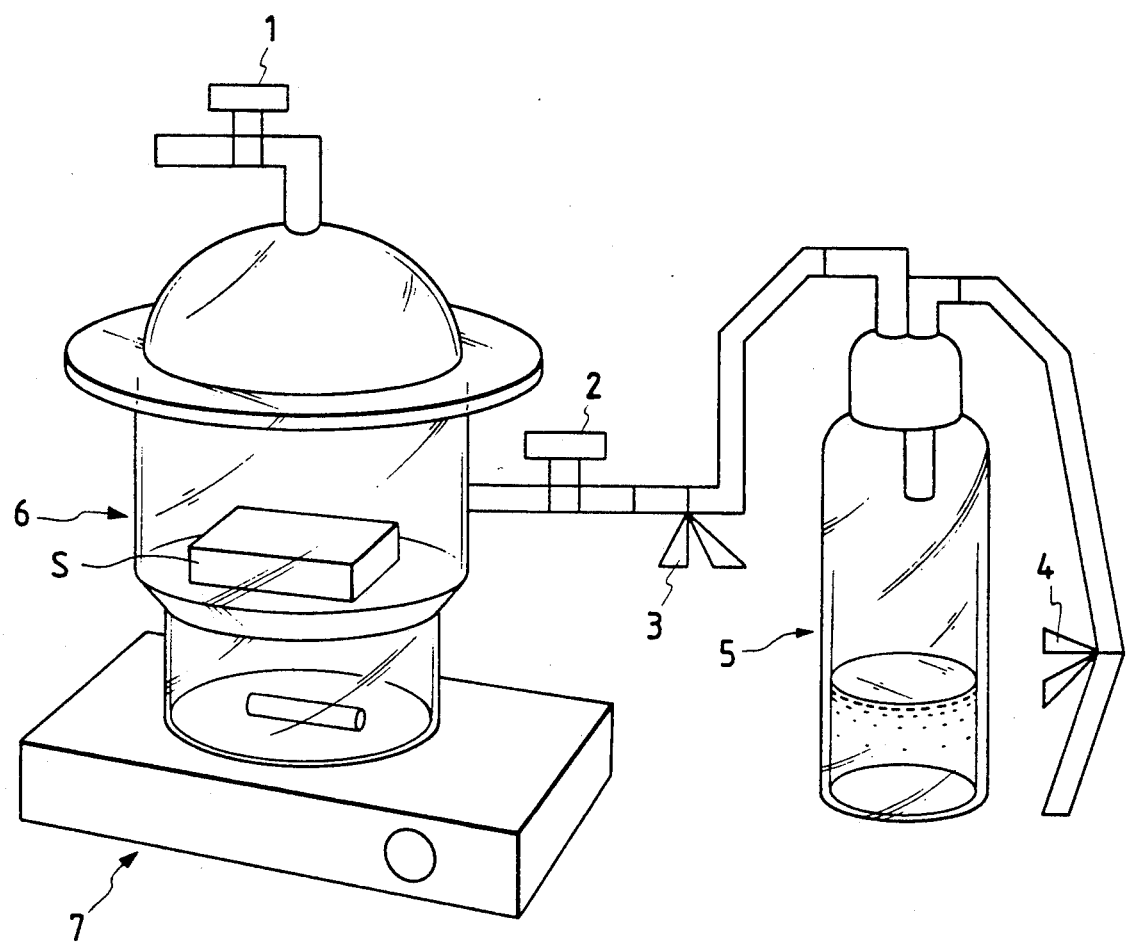

FIG. 1 is a schematic figure of the apparatus for measuring deodorizing ratios.

DETAILED DESCRIPTION OF PREFERRED EMBODIMENTS

The modified cellulose fiber of the present invention can be produced as follows. In order to obtain a chitin or chitosan fine particles of a particle diameter of 10 μm or less, it is possible that chitin or chitosan flakes are firstly charged into a grinder for micro-grinding to make the flakes into fine particles. However, due to the properties of chitin or chitosan, contamination from a grinding media cannot be avoided during the process of producing fine particle, so it is difficult to make fine particles of 10 μm or less.

It is therefore desirable to produce the particles according to the method proposed in Japanese Patent Laid-open Nos. 62827/1987 and 100534/1987. That is, chitosan is dissolved in an acidic aqueous solution, and the solution is defined as chitosan acidic solution. The chitosan is solidified and regenerated by adding the solution to a basic solution dropwise or the like; or acetylated chitosan is produced by acetylating the regenerated chitosan with acetic anhydride or the like in a polar solvent such as methanol, ethanol or the like, and is thoroughly washed in water until neutralized. Then, by further making the regenerated chitosan or regenerated acetylated chitosan into fine particles, fine particle regenerated chitosan or fine particle regenerated acetylated chitosan can be efficiently obtained.

Since the amino group within the chitosan molecule is greatly involved in the improvement of anti-funguses and deodorizing properties and dye-affinity, the acetylation degree is preferably a level at which approximately 20% of the amino group is left; specifically, the deacetylation degree is preferably not less than 20%.

For a fine particle process, routine grinders or spray dryers can be used. For a fine particle process with spray drying, a milk-like suspension of a mean particle diameter of 50 μm or less, is preferably used, obtained through preliminary grinding and dispersion with a routine moist grinder including homogenizer and the like. The suspension obtained in such manner is injected into and dried in a high-temperature atmosphere along with pressurized air injected from the circumference of a spinneret, and is then further processed into fine particles due to shrinking. The temperature in the high-temperature atmosphere is a temperature sufficient for drying the material to be dried, and is appropriately selected in a range between 100° and 180° C. The particle diameter of a fine particle to be obtained can be controlled by appropriate adjustment of the amount to be injected in the high-temperature atmosphere and by the applied air pressure. In order to obtain a dried material of a desirable particle diameter in a sound fashion, the dried material is further classified.

In order that the thus obtained fine particle regenerated chitosan or fine particle regenerated acetylated chitosan, of a particle diameter of 10 μm or less, is allowed to be contained in a cellulose regenerated fiber, such chitosan is used as it is or is preliminarily dissolved in water, or an alkaline aqueous solution, or a suitable amount of cellulose viscose can be added, and such solution is defined as a solution to be added. Prior to spinning, the mixing with cellulose viscose may be effected for spinning. Routine conditions for producing a cellulose regenerated fiber are applied to the spinning conditions. A particle diameter of 10 μm or more of fine particle regenerated chitosan or fine particle regenerated acetylated chitosan might possibly cause yarn breakage, depending on the pore diameter of a spinneret. The cellulose viscose to be used in the present invention is usually rayon viscose and polynosic viscose; the modified cellulose regenerated fiber of the present invention may be in any form including staple, filament, and the like; and an inorganic pigment such as titanium dioxide can be used concurrently, for dulling and the like.

The required mixing amount of the fine particles to cellulose is 0.5% by weight or more. If the mixing amount is less, desirable levels of anti-funguses properties and deodorizing properties cannot be achieved. In order to increase the mixing amount of the fine particles to exceed 3% by weight or more, further reduction in the particle diameter is required from the respect of the fiber tenacity. Accordingly, the mixing amount to cellulose, of fine particle regenerated chitosan or fine particle regenerated acetylated chitosan of a particle diameter of 10 μm or less, is preferably 0.5 to 2.0% by weight.

Because the modified cellulose regenerated fiber of the present invention contains fine particle regenerated chitosan or fine particle regenerated acetylated chitosan mixed therewith, it exhibits improved dye-affinity, as disclosed hereinabove, and possesses surprisingly deodorizing and anti-funguses properties which have never been observed in conventional regenerated cellulose fibers.

Examples of the present invention will now be explained hereinafter, but the present invention is not to be limited within the scope of the examples.

EXAMPLE 1

500 g of chitosan of a deacetylation degree of 82% and an average molecular weight of 42,000 were added to 7,750 g of water containing 250 g of acetic acid, to obtain an aqueous chitosan acetic acid solution. The viscosity of the solution at 20° C. was measured with a rotation viscometer, and it was 3,200 cps. The aqueous chitosan acidic solution was dropped into a 5% aqueous caustic soda solution to be solidified and regenerated into particles.

The solidified matter was sufficiently washed in water until neutralized, to which was then added water to a final 2-2.5% concentration of the solid material. Then, the resulting solution was repeatedly ground and dispersed at a rotation of 15,000 rpm for 3 minutes three times, which was turned into a milk-like suspension. This was filtered through a sieve of 120 mesh to separate bulky pieces. While being agitated with an agitator, the filtrate was injected, at a flow of 16 ml/min, along with pressurized air of 3.0 kg/cm$^2$ into high-temperature atmosphere at 170° -180° C. for drying. The dried matter was collected with a cyclone collector. The dried matter was classified using a pneumatic classifier (Spedic 250, manufactured by Seisin Kigyo, K.K.) to obtain 300 g of fine particle regenerated chitosan of a particle diameter of 5 μm or less.

The fine particle regenerated chitosan was dispersed into water to a final mixed amount of 0, 0.3, 0.5, 2.0 and 3.0% by weight to cellulose, respectively. The resulting fine particle regenerated chitosan dispersions were individually added to and uniformly mixed with 15 l each of rayon viscose (cellulose 9.0%, total alkali 6.0%, total sulfur 2.5%) obtained by conventional methods. After defoaming, a spinneret of 0.09 mmφ × 100 Holes was used for spinning at a spinning rate of 55 m/min into a spinning bath of 110 g/l of sulfuric acid, 300 g/l of sodium sulfate and 15 g/l of zinc sulfate at a temperature of 50° C. Drawing was effected according to routine two-bath stretch-spinning method and cutting was done into 32 mm, before routine scouring and dry processing, to produce modified cellulose regenerated fibers of 3 denier without yarn breakage, as samples Nos.

1 to 5. According to JIS L 1015 "Staple Testing Method of Chemical Fibers", these samples Nos. 1 to 5 were measured of fineness, dry tenacity, wet tenacity, knot tenacity and percentage of exhaustion. The results are shown in Table 1.

TABLE 1

| Sample No. | 1) Amount added | Fineness (d) | Dry tenacity (g/d) | Wet tenacity (g/d) | Knot tenacity (g/d) | Percentage of exhaustion (%) |
|---|---|---|---|---|---|---|
| 1 | 0 | 3.19 | 2.50 | 1.68 | 1.51 | 55.2 |
| 2 | 0.3 | 3.02 | 2.51 | 1.67 | 1.52 | 60.5 |
| 3 | 0.5 | 3.21 | 2.51 | 1.68 | 1.49 | 62.7 |
| 4 | 2.0 | 2.98 | 2.49 | 1.65 | 1.46 | 70.4 |
| 5 | 3.0 | 3.10 | 2.50 | 1.68 | 1.49 | 75.8 |

1) % by weight to cellulose

As is apparently shown in Table 1, no decrease in tenacity due to the mixing of fine particle regenerated chitosan of a particle diameter of 5 μm or less is observed. Dye-affinity is improved as the mixed amount increases.

EXAMPLE 2

500 g of chitosan of a deacetylation degree of 90% and an average molecular weight of 52,000 were added to 7,750 g of water containing 250 g of acetic acid, to obtain an aqueous chitosan acetic acid solution. The viscosity of the solution at 20° C. was measured with a rotation viscometer, and it was 4,000 cps. The aqueous chitosan acidic solution was dropped into a 5% aqueous ammonium solution, to be solidified and regenerated into straps.

The solidified matter was sufficiently washed in water until neutralized. Using a homogenizer as in Example 1, the resulting matter was then repeatedly ground and dispersed at a rotation of 15,000 rpm for 3 minutes three times, which was turned into a milk-like suspension. This was filtered through a sieve of 100 mesh. While agitated with an agitator, the filtrate was injected at a flow of 17 ml/min along with pressurized air of 4.0 kg/cm, into high-temperature atmosphere at 175° C. The dried matter was collected in a cyclone collector. The dried matter was classified as in Example 1, to obtain 360 g of fine particle regenerated chitosan of a particle diameter of 10 μm or less.

The fine particle regenerated chitosan was dispersed into water to a final mixed amount of 0, 0.3, 0.5, 2.0 and 3.0% by weight to cellulose, respectively. The resulting fine particle regenerated chitosan dispersions were added to and uniformly mixed with 15 l each of polynosic viscose (cellulose 5.0%, total alkali 3.5%, total sulfur 3%) obtained by conventional methods. After defoaming, a spinneret of 0.07 mmφ × 500 Holes was used for spinning at a spinning rate of 30 m/min into a spinning bath of 22 g/l of sulfuric acid, 0.5 g/l of zinc sulfate and 65 g/l of sodium sulfate at a temperature of 35° C., which was then drawn two-fold in a bath of 2 g/l of sulfuric acid and 0.05 g/l of zinc sulfate at a temperature of 25° C. and was cut into 38 mm. Then, through the process under the conditions of 1 g/l of sodium carbonate and 2 g/l of sodium sulfate at a temperature of 60° C. and subsequent process in 5 g/l of sulfuric acid and at a temperature of 65° C., routine scouring and drying process was effected to produce modified cellulose regenerated fibers of 1.25 denier without yarn breakage, as samples Nos. 6 to 10. These samples Nos. 6 to 10 were measured of fineness, dry tenacity, wet tenacity, knot tenacity and percentage of exhaustion as in Example 1. The percentage of exhaustion was measured, after defining anhydrous sulfuric acid as ⅓, described in 7.30 "Assistants" of JIS L 1015 "Staple Testing Method of Chemical Fibers". The results are shown in Table 2.

TABLE 2

| Sample No. | 1) Amount added | Fineness (d) | Dry tenacity (g/d) | Wet tenacity (g/d) | Knot tenacity (g/d) | Percentage of exhaustion (%) |
|---|---|---|---|---|---|---|
| 6 | 0 | 1.22 | 4.56 | 3.77 | 2.06 | 56.4 |
| 7 | 0.3 | 1.19 | 4.57 | 3.67 | 2.25 | 59.4 |
| 8 | 0.5 | 1.21 | 4.52 | 3.69 | 2.26 | 62.0 |
| 9 | 2.0 | 1.20 | 4.48 | 3.52 | 2.11 | 71.5 |
| 10 | 3.0 | 1.27 | 4.37 | 3.52 | 2.05 | 76.3 |

1) % by weight to cellulose

As is shown in the results, the case of polynosic fiber has the same properties as in the case of the rayon fiber in Example 1. More or less reduction in the tenacity is observed as the mixed amount increases, due to the particle size of 10 μm or less of the fine particle regenerated chitosan. However, it does not practically cause any problem.

EXAMPLE 3

500 g of chitosan of a deacetylation degree of 82% and an average molecular weight of 46,000 were added to 7,500 g of water containing 250 g of acetic acid, to obtain an aqueous chitosan acetic acid solution of a viscosity of 3,200 cps at 25° C. From a spinneret of a hole size of 0.25 mmφ, this was made to drop at a constant amount into an aqueous basic solution consisting of 10% caustic soda, 20% methanol and 70% water, under pressure, to be solidified and regenerated in particles. This was washed until neutralized, to produce a regenerated chitosan particle matter. This was replaced for ethanol four times. Using an equimolar acetic anhydride, this was reacted at atmospheric temperature for 24 hours, washed in ethanol and subsequently in water. The resulting solution was reacted with 0.5N caustic soda at atmospheric temperature for 1 hour for cutting of the ester bond, before washing in water, to obtain 5.0 l of regenerated acetylated chitosan at a deacetylation degree of 23%.

To 5.0 l of the regenerated acetylated chitosan was added 4.75 l of water and repeatedly ground with a homogenizer for 5 minutes two times, to which was then further added 4.75 l of water to obtain a dispersion of a 3.47% concentration. At a flow of 14 ml/min, the dispersion was injected along with pressurized air of 3.6 kg/cm² into high-temperature atmosphere at 180° C. The dried matter was collected in a cyclone collector. The dried matter was classified with a classifier as in Example 1, to obtain 200 g of fine particle regenerated acetylated chitosan of a particle diameter of 10 μm or less.

As in Example 2, this was added to and mixed with polynosic viscose, which was then spun and drawn for routine scouring and drying process, to produce modified cellulose regenerated fibers of 1.25 denier × 38 mm without yarn breakage, as samples Nos. 11 to 15. The fineness, dry tenacity, wet tenacity, knot tenacity and percentage of exhaustion of them were measured as in Example 2, and the results are shown in Table 3.

TABLE 3

| Sample No. | 1) Amount added | Fineness (d) | Dry tenacity (g/d) | Wet tenacity (g/d) | Knot tenacity (g/d) | Percentage of exhaustion (%) |
| --- | --- | --- | --- | --- | --- | --- |
| 11 | 0 | 1.23 | 4.46 | 3.49 | 2.18 | 51.4 |
| 12 | 0.3 | 1.22 | 4.47 | 3.30 | 2.20 | 52.0 |
| 13 | 0.5 | 1.20 | 4.31 | 3.32 | 2.29 | 53.2 |
| 14 | 2.0 | 1.24 | 4.36 | 3.23 | 1.92 | 55.6 |
| 15 | 3.0 | 1.26 | 4.14 | 3.10 | 1.80 | 54.9 |

1) % by weight to cellulose

As is apparently shown from the results, the case with fine particle regenerated acetylated chitosan had the same properties as those of the fine particle regenerated chitosan as in Example 2.

TESTING EXAMPLE 1

As to the modified cellulose regenerated fibers (Sample Nos. 1 to 15) obtained in Examples 1 to 3, the measuring method of the number of bacteria followed the Manual of Evaluation and Test of the Effects of Processing Anti-Fungus and Deodorizing Products, Association of Antibacterial Treatments for textiles, Japan. The method is described hereinbelow. Measurement method of the number of bacteria Staphyllococcus aureus IFO 12732 was used as a testing bacterium, which was cultured in nutrient broth and adjusted to $5-30 \times 10^5$/ml. This was defined as a suspension of the testing bacterium. The suspension of 0.2 ml was uniformly inoculated in 0.2 g of a sample placed in a sterilized vial equipped with a screw, and was left to stand for culture at 35° to 37° C. for 18 hours. Then, after adding 20 ml of sterilized buffered saline to the vessel, the vessel was strongly shaken by hands at a stroke of about 30 cm, 25 to 30 times, to disperse the fresh bacteria under the test into the solution. The resulting dispersion was prepared into an appropriate dilution series with sterilized buffered saline, and 1 ml of each of the diluted solutions at individual stages was placed in a sterilized petri dish. Concerning each of the diluted solutions, two plates containing about 15 ml of standard agar broth were prepared. They were cultured at 35° to 37° C. for 24 to 48 hours, and the colony number in growth was counted. Multiplying the dilution, the actual number of the bacteria in the samples was calculated. The effect was judged, by determining the increment or decrement by the following formula based on the average number of the bacteria in hexaplicate samples of each of the samples with no addition of fine particle regenerated chitosan or fine particle regenerated acetylated chitosan, and in triplicate samples of each of the mixed samples. The increment of 1.6 or more was judged effective against fungus. Formula 1

$$\text{Increment or decrement} = \log\left(\frac{B}{A}\right) - \log\left(\frac{C}{A}\right)$$

wherein:

A: Average number of the bacteria, dispersed and recovered immediately after inoculation of the testing bacterium on a sample without addition.
B: Average number of the bacteria, cultured for 18 hours, dispersed and recovered, after inoculation of the testing bacterium on a sample without addition.
C: Average number of the bacteria, cultured for 18 hours, dispersed and recovered after inoculation of the testing bacterium on a sample with addition.

The results of measuring the individual samples are shown in Table 4.

TABLE 4

| Sample No. | Amount added (% by weight to cellulose) | Effect Increment or decrement | Judgment |
| --- | --- | --- | --- |
| 1 | 0 | — | — |
| 2 | 0.3 | 1.0210 | Negative |
| 3 | 0.5 | 1.7210 | Positive |
| 4 | 2.0 | 2.1032 | Positive |
| 5 | 3.0 | 2.4717 | Positive |
| 6 | 0 | — | — |
| 7 | 0.3 | 1.1673 | Negative |
| 8 | 0.5 | 1.6690 | Positive |
| 9 | 2.0 | 2.0149 | Positive |
| 10 | 3.0 | 2.5333 | Positive |
| 11 | 0 | — | — |
| 12 | 0.3 | 1.1340 | Negative |
| 13 | 0.5 | 1.6809 | Positive |
| 14 | 2.0 | 2.1326 | Positive |
| 15 | 3.0 | 2.2478 | Positive |

As is apparently shown from the results, modified cellulose regenerated fibers provided with anti-fungus property can be obtained when 0.5% by weight of fine particle regenerated chitosan or fine particle regenerated acetylated chitosan to cellulose is mixed.

TESTING EXAMPLE 2

Using a washing solution, namely, an aqueous mixed solution of 5 g/l of a detergent and 2 g/l of anhydrous sodium carbonate, according to the method A of JIS L 0844 "Testing Method of Dye Fastness in Washing", samples Nos. 1 to 15 obtained in Examples 1, 2 and 3, were repeatedly washed at 70° C. for 45 minutes five times. The test of anti-fungus property after washing was carried out as in Testing Example 1. The results are shown in Table 5.

TABLE 5

| Sample No. | Amount added (% by weight to cellulose) | Effects after 5 repeated washings Increment or decrement | Judgment |
| --- | --- | --- | --- |
| 1 | 0 | — | — |
| 2 | 0.3 | 1.1282 | Negative |
| 3 | 0.5 | 1.8250 | Positive |
| 4 | 2.0 | 2.1322 | Positive |
| 5 | 3.0 | 2.4386 | Positive |
| 6 | 0 | — | — |
| 7 | 0.3 | 1.0852 | Negative |
| 8 | 0.5 | 1.9254 | Positive |
| 9 | 2.0 | 2.1089 | Positive |
| 10 | 3.0 | 2.2822 | Positive |
| 11 | 0 | — | — |
| 12 | 0.3 | 1.1032 | Negative |
| 13 | 0.5 | 1.7210 | Positive |
| 14 | 2.0 | 2.1673 | Positive |
| 15 | 3.0 | 2.0210 | Positive |

As is apparently shown from the results, the modified cellulose regenerated fiber mixed with 0.5% by weight or more to cellulose, of fine particle regenerated chitosan or fine particles regenerated acetylated chitosan, maintains the anti-fungus property after the washing.

TESTING EXAMPLE 3

30 g of each of the samples Nos. 1 to 15, obtained in Examples 1, 2 and 3, were placed in 14 l of a scouring and bleaching solution composed of 4.0 g/l of hydrogen peroxide (35%), 2.0 g/l of sodium hydroxide (48 Baume degree), 3.5 g/l of sodium silicate (66%), 1.0 g/l of a penetrant (Dye-Safe, manufactured by Daiichi Kogyo Seiyaku Co. Ltd.), and 1.0 g/l of sodium tripolyphosphate, processed at 90° C. for 1 hour, and washed in lukewarm water at 60° C. for 10 minutes and subsequently in water for 5 minutes for scouring and bleaching process. Then, 0.9% solution of a reactive dye (Sumifix Suprablue BRF, manufactured by Sumitomo Kagaku Co., Ltd.) was prepared, and each sample was reacted in the presence of 50 g/l of sodium sulfate and 20 g/l of sodium carbonate at 60° C. for 60 minutes, at a bath ratio of 1:19.5, which was then washed in water for 5 minutes, to dye the samples Nos. 1 to 15. The samples Nos. 1-A to 15-A were obtained. These dyed samples Nos. 1-A to 15-A were subjected to the antifunguses property test as in the Testing Examples 1 and 2, and the results obtained are shown in Table 6.

TABLE 6

| Sample No. | Amount added (% by weight to cellulose) | Effect without washing | | Effect after 5 repeated washing | |
|---|---|---|---|---|---|
| | | Increment or decrement | Judgment | Increment or decrement | Judgment |
| 1-A | 0 | — | — | — | — |
| 2-A | 0.3 | 1.2240 | Negative | 1.0852 | Negative |
| 3-A | 0.5 | 1.8906 | Positive | 1.8250 | Positive |
| 4-A | 2.0 | 2.1032 | Positive | 2.1089 | Positive |
| 5-A | 3.0 | 3.9644 | Positive | 2.2822 | Positive |
| 6-A | 0 | — | — | — | — |
| 7-A | 0.3 | 1.4386 | Negative | 1.5333 | Negative |
| 8-A | 0.5 | 2.6982 | Positive | 2.5001 | Positive |
| 9-A | 0.5 | 3.9622 | Positive | 2.9068 | Positive |
| 10-A | 3.0 | 4.1089 | Positive | 3.9644 | Positive |
| 11-A | 0 | — | — | — | — |
| 12-A | 0.3 | 1.3624 | Negative | 1.5297 | Negative |
| 13-A | 0.5 | 1.7021 | Positive | 1.9254 | Positive |
| 14-A | 2.0 | 2.3211 | Positive | 2.0390 | Positive |
| 15-A | 3.0 | 2.5333 | Positive | 2.1032 | Positive |

As is clearly shown from the results, the modified cellulose regenerated fibers mixed with 0.5% by weight or more to cellulose, of fine particle regenerated chitosan or fine particle regenerated acetylated chitosan, sufficiently maintain the antifungus property without losing such property, after the dyeing and even after the washing.

TESTING EXAMPLE 4

Using the samples Nos. 1 to 15 and the samples Nos. 1-A to 15-A, obtained in Examples 1, 2 and 3, deodorizing property against ammonia and hydrogen sulfide was tested with an apparatus shown in FIG. 1, to determine the deodorizing ratio based on the following formula.

Deodorizing ratio (%) =

$$\frac{(\text{Intitial gas concentration} - \text{remaining gas concentration})}{\text{Initial gas concentration}} \times 100$$

The testing method is as follows.

Ammonia

There was placed 1 ml of aqueous ammonia (25%) of super reagent grade, (manufactured by Wako Junyaku Co., Ltd.,) into a glass bottle 5. After closing the lid, it was left to stand for 2 minutes to generate ammonia gas. The cocks 1, 2, 3 and 4 of the apparatus were subsequently opened in the above order. An appropriate amount of ammonia gas generated in a desiccator 6 in which was placed 20 g of a sample S preliminarily prepared and dried at 60° C. for 1 hour, was absorbed. While rotating a magnetic stirrer 7 after closing cocks 1 and 2, the ammonia concentration inside the desiccator after left to stand for 1 minute was adjusted to 100 ppm which was detected with a gas detector (manufactured by Gas Tech Co., Ltd.). After it was left to stand further for 5 minutes and no gas leakage was confirmed, the gas was allowed to remain on contact with the sample for 1 hour to determine the concentration of the remaining gas.

Hydrogen sulfide

Into a glass bottle 5 were added 5 ml of water, 5 ml of hydrogen chloride, and 0.1 g of iron sulfide, and reacted for 20 minutes to generate hydrogen sulfide. Subsequently opening in the following order the cocks 1, 2, 3 and 4 of the apparatus, an appropriate amount of gas generated in a desiccator 6 in which was placed 2 g of a sample S preliminarily prepared and dried at 60° C. for 1 hour, was absorbed. While rotating a magnetic stirrer 7 after closing cocks 1 and 2, the hydrogen sulfide concentration inside the desiccator after having been left to stand for 1 minute was adjusted to 60 ppm, which was detected with a gas detector (manufactured by Gas Tech Co., Ltd.). After it was left to stand further for 5 minutes and no gas leakage was confirmed, the gas was allowed to remain on contact with the sample for 1 hour to determine the concentration of the remaining gas.

The samples Nos. 1 to 15 obtained in Examples 1, 2 and 3, and the samples obtained by washing them as in Testing Example 2 were measured in respect of deodorizing ratios. The results are shown in Table 7. The results of measuring deodorizing ratios of the samples Nos. 1-A to 15-A are shown in Table 8.

TABLE 7

| Sample No. | Amount added (% by weight to cellulose) | Deodorizing ratio (%) | | | |
|---|---|---|---|---|---|
| | | Without washing | | After 5 times repeated washings | |
| | | Ammonium | Hydrogen sulfide | Ammonium | Hydrogen sulfide |
| 1 | 0 | 0 | 0 | 10.0 | 0 |
| 2 | 0.3 | 47.5 | 30.3 | 49.7 | 26.7 |
| 3 | 0.5 | 59.5 | 47.2 | 71.0 | 48.7 |
| 4 | 2.0 | 72.0 | 54.2 | 68.2 | 54.2 |
| 5 | 3.0 | 71.0 | 63.8 | 79.0 | 61.7 |
| 6 | 0 | 0 | 0 | 10.0 | 16.7 |
| 7 | 0.3 | 51.5 | 45.8 | 56.0 | 32.3 |
| 8 | 0.5 | 54.0 | 68.3 | 67.0 | 66.5 |
| 9 | 2.0 | 68.1 | 72.5 | 78.0 | 68.8 |
| 10 | 3.0 | 68.5 | 79.2 | 79.6 | 70.3 |
| 11 | 0 | 0 | 0 | 0 | 0 |
| 12 | 0.3 | 38.3 | 29.3 | 36.8 | 30.1 |
| 13 | 0.5 | 52.6 | 51.0 | 49.3 | 34.7 |
| 14 | 2.0 | 68.4 | 57.3 | 54.6 | 62.4 |
| 15 | 3.0 | 61.7 | 60.1 | 58.2 | 69.7 |

TABLE 8

| Sample No. | Amount added (% by weight to cellulose) | Deodorizing ratio (%) | | | |
|---|---|---|---|---|---|
| | | Without washing | | After 5 times repeated washings | |
| | | Ammonium | Hydrogen sulfide | Ammonium | Hydrogen sulfide |
| 1-A | 0 | 0 | 0 | 0 | 0 |
| 2-A | 0.3 | 42.5 | 46.7 | 46.3 | 50.0 |
| 3-A | 0.5 | 49.5 | 51.7 | 48.8 | 53.3 |
| 4-A | 2.0 | 69.0 | 53.2 | 68.2 | 61.3 |
| 5-A | 3.0 | 72.0 | 72.5 | 70.0 | 70.0 |
| 6-A | 0 | 0 | 0 | 0 | 0 |
| 7-A | 0.3 | 60.0 | 41.7 | 50.0 | 42.5 |
| 8-A | 0.5 | 69.0 | 60.0 | 59.0 | 51.7 |

TABLE 8-continued

| Sample No. | Amount added (% by weight to cellulose) | Deodorizing ratio (%) | | | |
|---|---|---|---|---|---|
| | | Without washing | | After 5 times repeated washings | |
| | | Ammonium | Hydrogen sulfide | Ammonium | Hydrogen sulfide |
| 9-A | 2.0 | 65.0 | 68.3 | 68.4 | 66.7 |
| 10-A | 3.0 | 71.0 | 72.5 | 74.1 | 73.3 |
| 11-A | 0 | 0 | 0 | 0 | 0 |
| 12-A | 0.3 | 40.3 | 28.6 | 47.5 | 29.2 |
| 13-A | 0.5 | 51.2 | 48.3 | 51.5 | 49.7 |
| 14-A | 2.0 | 56.8 | 50.0 | 54.0 | 54.2 |
| 15-A | 3.0 | 59.4 | 56.2 | 59.5 | 58.3 |

As is clearly shown in the results, excellent deodorizing property can be provided when 0.5% by weight or more of fine particle regenerated chitosan or fine particle regenerated acetylated chitosan is mixed with cellulose. And the deodorizing property can be maintained with no loss, even after dye processing or washing.

As is apparently shown in the Examples and Testing Examples described above, in accordance with the present invention, by mixing 0.5% by weight or more of fine particle regenerated chitosan or fine particle regenerated acetylated chitosan with cellulose regenerated fiber, there can be obtained a highly safe modified cellulose regenerated fiber having a sufficient tenacity practically endurable, being prepared without damage on the essential tenacity, having improved dye affinity, and being provided with deodorizing and anti-funguses properties, these properties never being lost by washing and the like.

What is claimed is:

1. Modified cellulose regenerated fiber containing fine particles selected from the group consisting of particles having a diameter less than 10 μm of a material regenerated chitosan and particles of regenerated acetylated chitosan wherein the mixing amount of said fine particles to the cellulose element of said modified cellulose regenerated fiber is at least 0.5% by weight.

2. Modified cellulose regenerated fiber as claimed in claim 1, wherein the mixing amount of said fine particles to the cellulose element of said modified cellulose regenerated fiber is in a range of 0.5 to 2.0% by weight.

3. Modified cellulose regenerated fiber as claimed in claim 1, wherein said modified cellulose regenerated fiber is rayon viscose fiber and polynosic viscose fiber.

4. Modified cellulose regenerated fiber as claimed in claim 1, wherein said modified cellulose regenerated fiber is obtained by mixing said fine particles with cellulose viscose, and spinning the mixture.

5. Modified cellulose regenerated fiber as claimed in claim 1, wherein said modified cellulose regenerated fiber is provided with deodorizing property.

6. Modified cellulose regenerated fiber as claimed in claim 1, wherein said modified cellulose regenerated fiber is provided with an anti-fungus property.

* * * * *